July 17, 1962 M. L. HARRISON 3,044,268
HIGH PUMPING EFFICIENCY MASTER CYLINDER
Filed Nov. 17, 1960
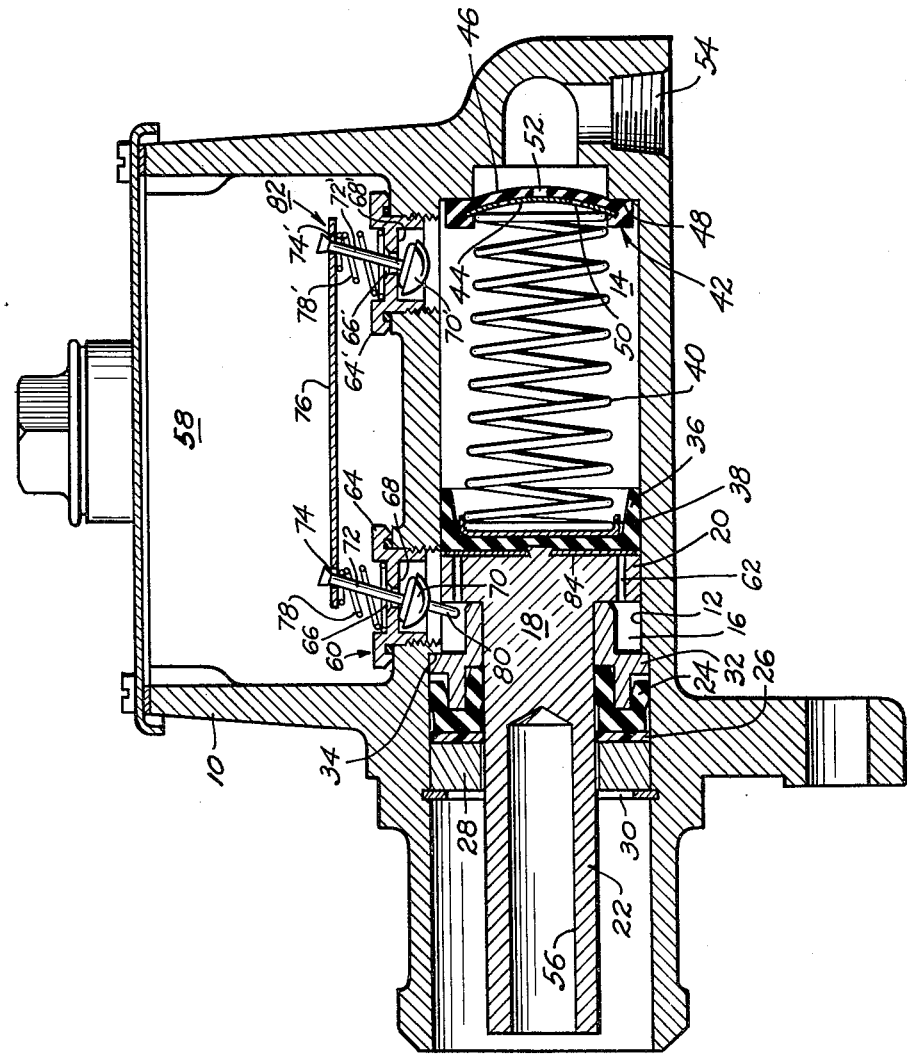
INVENTOR.
MYRON L. HARRISON
BY
William P. Hickey
ATTORNEY.

United States Patent Office 3,044,268
Patented July 17, 1962

3,044,268
HIGH PUMPING EFFICIENCY MASTER CYLINDER
Myron L. Harrison, South Bend, Ind., assignor to The Bendix Corporation, a corporation of Delaware
Filed Nov. 17, 1960, Ser. No. 70,070
3 Claims. (Cl. 60—54.6)

The present invention relates to hydraulic pressure developing devices; and more particularly to the type of hydraulic master cylinder used to actuate the hydraulic braking systems of automotive vehicles.

An object of the present invention is the provision of a new and improved master cylinder whose fluid displacement member can be retracted and restroked or pumped to force additional quantities of fluid into its driven system, and which is shorter and more compact than prior art master cylinders having a high pumping efficiency.

A further object of the present invention is the provision of a new and improved pumping master cylinder having valve mechanisms which communicate a reservoir to both its follow-up chamber and its pressurizing chamber, and which does not require structure in the pressurizing chamber for operating the compensating valve for the pressurizing chamber.

The invention resides in certain construction and combinations and arrangements of parts; and further objects and advantages of the invention will become apparent to those skilled in the art to which the invention relates from the following description of the preferred embodiment described with reference to the accompanying drawing forming a part of this specification, and in which:

The solitary figure of the drawing is a cross sectional view of a master cylinder embodying principles of the present invention.

The master cylinder, shown in the drawing, generally comprises a housing 10 having a longitudinally extending cylinder bore or chamber 12 therein. The chamber 12 is divided into a pressurizing or output chamber 14 and a follow-up chamber 16 by means of a movable wall or piston 18. The piston 18 comprises a generally flange shaped portion 20 which separates the chambers 14 and 16 and an axially extending boss 22 that extends towards the rear end of the cylinder bore 12. A suitable annular cup seal 24 is positioned between the boss 22 and the sidewalls of the chamber 12 to provide a seal therebetween; and the seal 24 is prevented from being forced out of the chamber 12 by means of a spauldite guide washer 26, metal retaining ring 28 and snap ring 30. The seal 24 is held into engagement with the spauldite guide washer 26 by means of an annular lip spreader 32, which in turn is seated against a shoulder 34 that is formed by a counterbore in the outer end of the cylinder bore 12. The piston 18 is shown in the drawing in its retracted position, wherein the flange portion 20 engages the annular lip spreader 32, and a suitable cup seal 36 is provided on the inner end of the piston 18 for effecting a hydraulic seal between the piston and the sidewalls of the cylinder bore 12. The cup seal 36 is generally held against the front face of the piston 18 by means of a retaining ring 38 biased against the seal by a piston return spring 40—the opposite end of which is positioned against a residual pressure check valve 42.

The residual pressure check valve 42 is of conventional design and is formed by means of a spherically disked member or disc 44 over which is snapped a rubber diaphragm 46 having thickened outer peripheral walls which are snapped around the outer periphery of the disc to hold the membrane in place. The outer periphery of the rubber diaphragm 46 is biased against a shoulder 48 on the inner end of the chamber 12 by means of the piston return spring 40, so as to normally prevent flow from the pressurizing chamber 14 around the outer periphery of the rubber diaphragm. Flow from the pressurizing chamber 14 passes through a plurality of openings 50 in the disc 44 to move the diaphragm 46 away from the disc sufficiently to permit the fluid to flow through the central opening 52 in the rubber membrane 46, and thereby flow to the outlet port or connection 54 of the master cylinder. Return flow from the system that is connected to the outlet port 54 will of course bias the check valve structure 42 away from the shoulder 48 so that return flow through the outlet port 54 flows around the outer periphery of the rubber membrane 46 to the pressurizing chamber 14.

The piston 18 is adapted to be driven into the cylinder bore 12 by means of a push rod, not shown, which is connected to the usual foot pedal lever of an automotive vehicle. The push rod is adapted to be received in the bore 56 of the piston 18; and in the type of master cylinder shown in the drawing, it is usually desired that the master cylinder will be capable of actuating the driven braking system with a minimum of force and piston displacement. The master cylinder shown in the drawing has been designed so that one stroke of the piston 18 will provide the normal requirement of the driven braking system; and should an additional quantity of fluid be required to operate the braking system, it is intended that the piston 18 will be quickly retracted and again stroked or pumped to supply an additional quantity of fluid into the driven braking system.

In master cylinders of the type shown in the drawing, it is necessary to communicate the output chamber 14 with a reservoir 58 of low pressure fluid each time that the piston 18 is moved back into its fully retracted position shown in the drawing, so as to compensate for changes in volume in the braking system connected to the outlet port 54, and/or leakage etc. Prior art structures with which I am familiar for compensating for this change in volume or loss of fluid in the braking system, have either used: a compensating port which is located just forwardly of the retracted position of the cup seal 36, or a valving arrangement which is actuated by structure that is attached to or held upon the inner face of the cup seal 36. A difficulty encountered with the first mentioned type of valving mechanism is that the seal 36 slides past the port and thereafter allows the follow-up chamber 16 to be communicated to the reservoir 58 through the compensating port; and the difficulty with the latter type of valving mechanism is that the outlet chamber 14 and hence the whole master cylinder must be extended by an amount which will accommodate the structure in the outer chamber 14 which is used to actuate the compensating valve mechanism.

According to principles of the present invention means are provided for actuating a compensating valve without increasing the length of the output chamber 14 to accommodate a valve actuating mechanism; so that a master cylinder of high pumping efficiency is provided without at the same time increasing the length or size of the master cylinder housing.

In order that a master cylinder of high pumping efficiency will be provided, a positively acting valve structure or check valve 60 is used between the reservoir 58 and follow-up chamber 16, to permit fluid to be drawn in to the follow-up chamber 16 as the piston 18 is actuated or moved down its bore 12, and to close off communication between the reservoir 58 and follow-up chamber 16 during the retractile stroke of the piston 18. Fluid trapped in the follow-up chamber 16 is therefore forced through the openings 62 in the piston flange 20 and around the outer periphery of the cup seal 36 into the output chamber 14 during retractile stroke of the piston 18. This assures that all of the fluid which has been added to the follow-up chamber 16 during the pressure stroke of the piston, will be forced into the output chamber 14 without loss during the retractile stroke of the piston 18; so that this additional quantity of fluid can be forced into the braking system during the next forward stroke of the piston 18.

The check valve 60, shown in the drawing, comprises a threaded valve seat member 64 which is screwed into a suitable opening between the reservoir 58 and follow-up chamber 16. The valve seat member 64 has a compensating port 66 therethrough, and the inner surface of the valve seat member 64 surrounding the compensating port 66 forms a suitable valve seat 68 for a valve closure or poppet member 70. The poppet member 70 is provided with a stem portion 72 which extends upwardly through the compensating port 66. The upper end of the stem portion 72 is pivotally secured to a lever 76, whose purpose will later be described. The upper end of the stem 72 passes through an opening 74 in the lever 76 and the portion above the lever is enlarged or flattened to prevent separation of the port. Hole 74 is sufficiently large relative to the stem 72 to allow the stem to pivot with respect to the lever 76. The poppet member 70 is biased to a valve closing position against the valve seat 68 by means of a coil spring 78 that is interpositioned between the top of the valve seat member 64 and the bottom of the lever 76; and in order that the poppet member 70 will be moved away from its seat when the piston 18 is in its normal retracted position shown in the drawing, a second stem portion 80 is provided on the bottom side of the poppet member 70 so as to be engaged with the rear surface of the flange 20 of the piston 18 as it is retracted into the position shown in the drawing. The compensating port 66 is positioned just forwardly or inwardly of the retracted position of the rear face of the flange 20; so that the retractile movement of the piston 18 engages the stem 80 when the flange 20 is a slight distance inwardly of the lip spreader 32; and so that retractile movement from the time that the stem 80 is first engaged tilts the poppet 70 into the position shown in the drawing. In the retracted position shown, therefore, fluid is free to flow from the reservoir 58 to the follow-up chamber 16.

The compensating valve 82 which is used for communicating the reservoir 58 with the output chamber 14 is generally similar to the compensating valve 16 previously described, excepting that it does not have the second stem portion for opening the valve. Those portions of the compensating valve 82 which correspond to similar portions of the compensating valve 60 are designated by a like reference numeral characterized further in that a prime mark is affixed thereto. In the embodiment shown in the drawing, the lever 76 extends forwardly over the compensating valve 82; and its stem portion 72' extends through an opening 74' in the lever 76 so that movement of the lever 76 actuates the compensating valve 82. The openings 74 and 74' are spaced apart approximately the same distance as the spacing between the compensating ports 66 and 66'; so that the springs 78 and 78' will close the respective compensating valves when no external forces are applied thereto. By means of the arrangement shown in the drawing, retractile movement of the piston 18 engages the second stem portion 80 of the compensating valve 60 to tilt the poppet 70 away from its valve seat 68. During this tilting movement, the stem 72 will generally engage the rear surface of the compensating port 66; so that the top end of the stem portion 72 forces the lever 76 forwardly, to in turn move the stem 72' of the compensating valve 82 forwardly, and thereby tilt the poppet member 70' out of engagement with its valve seat 68'.

In the normal deenergized condition of the master cylinder, the parts will generally be in the position shown in the drawings. When it is desired to actuate the brakes of the driven system, the piston 18 is moved forwardly to permit the springs 78 and 78' to bias the poppet 70 and 70' against their respective seats 68 and 68'. Thereafter forward movement of the piston 18 develops pressure in the output chamber 14 to firmly seat the poppet 70' and force fluid through the outlet port 54—thereby actuating the brakes of the driven system. The springs 78 and 78' are generally no stronger than is required to overcome the weight of the lever 76 and compensating valve parts; so that the expansion of the follow-up chamber 16, which occurs during forward movement of the piston 18, pulls fluid from the reservoir 58 into the follow-up chamber 16 without producing any appreciable negative pressure.

When it is desired to release the braking application, the force exerted upon the piston 18 is reduced; whereupon the pressure in the driven braking system, plus the strength of the piston return spring 40, forces the piston 18 rearwardly. Rearward movement of the piston 18 develops pressure in the follow-up chamber 16 which firmly seats the poppet 70 against the seat 68 to cause the fluid in the follow-up chamber 16 to flow through the openings 62, past the thin anti-extrusion plate 84 covering the openings and thence past or around the outer periphery of the seal 36 to the output chamber 14. Should the piston 18 not be retracted into a position opening the compensating valves 60 and 82, a reapplication of the brakes forces the additional fluid supplied from the follow-up chamber 16 to the driven braking system.

One of the purposes of the residual pressure check valve structure 42 is to retard return fluid flow from the driven braking system. By incorporation of the residual pressure check valve structure 42, it is possible to permit the piston 18 to be quickly released into its fully retracted position and thereby open the compensating valves 60 and 82 without immediately losing the fluid which had previously been forced into the output chamber 14 from the follow-up chamber 16, to the reservoir 58. On the other hand a slow reapplication of the brakes will permit substantially all of the fluid which had previously been pumped into the output chamber 14 from the follow-up chamber to return past the valve 42 and then flow into the reservoir 58.

It is intended that the braking system which is connected to the outlet port 54 of the master cylinder, shown, will be filled by placing the fluid in reservoir 58 under pressure to force fluid flow through the system. A further advantage of the present invention is that the valve opening mechanism for compensating valve 82 permits its poppet 70' to move well away from its seat 68' to permit full flow therethrough, such as is required during pressure filling and bleeding of the system. It will further be seen that the present invention solves the problem of actuating a valve which is subjected to high pressure without it being necessary to provide a pressure sealing arrangement for its valve actuating mechanism.

It will be seen that the objects heretofore enumerated as well as others have been accomplished, and that there has been provided a master cylinder of greatly improved pumping ability which is no longer or larger in size than prior art master cylinders that have not had positive pumping ability.

While the invention has been described in considerable detail, I do not wish to be limited to the particular construction shown and described; and it is my intention to cover hereby all novel adaptations, modifications, and arrangements thereof which come within the practice of those skilled in the art to which the invention relates.

I claim:

1. In a fluid pressurizing device: a housing having a fluid chamber therein, a movable wall dividing said chamber into a pressurizing chamber and a follow-up chamber, said movable wall having a normal retracted position from which it is moved to force fluid out of said pressurizing chamber, check valve means for passing fluid from said follow-up chamber to said pressurizing chamber, a reservoir of low pressure fluid overlying said chambers, a first compensating port communicating said follow-up chamber to said reservoir and having a valve seat facing said follow-up chamber, a second compensating port communicating said pressurizing chamber to said reservoir and having a valve seat facing said pressurizing chamber, first and second valve closure members for abutment with said valve seats of respective first and second compensating ports, said first and second compensating ports being arranged to prevent flow from said chambers to said reservoir when their valve closure members abut their valve seats, means normally biasing said valve closure members closed, first and second valve opening structures respectively projecting into said reservoir, connecting means in said reservoir between said valve opening structures for transmitting valve opening movement from said first valve to said second valve, and means biasing said first valve open when said movable wall is in its retracted position.

2. In a fluid pressurizing device: a housing having a fluid chamber therein, a movable wall dividing said chamber into a pressurizing chamber and a follow-up chamber, said movable wall having a normal retracted position from which it is moved to force fluid out of said pressurizing chamber, check valve means for passing fluid from said follow-up chamber to said pressurizing chamber, a reservoir of low pressure fluid overlying said chambers, a first compensating port communicating said follow-up chamber to said reservoir and having a valve seat facing said follow-up chamber, a second compensating port communicating said pressurizing chamber to said reservoir and having a valve seat facing said pressurizing chamber, first and second valve closure members for abutment with said valve seats of respective first and second compensating ports, said first and second compensating ports being arranged to prevent flow from said chambers to said reservoir when their valve closure members abut their valve seats, each of said first and second valve closure members having a stem portion which projects through respective valve ports into said reservoir, and a cross link in said reservoir connecting the tops of said stem portions, spring means biasing said valve closure members against said valve seats, said first valve closure member having another projection abutted by said movable wall for opening said valves when said movable wall is in its retracted position.

3. In a fluid pressurizing device: a housing having a forwardly and rearwardly extending fluid pressure chamber opening outwardly of the rear end of said housing; a piston in said fluid pressure chamber, said piston having a flange portion extending across said chamber, said piston also having a rearwardly extending axial projection; sealing means between said projection and the sidewalls of said chamber, said flange of said piston having a normal retracted position adjacent said sealing means; means permitting flow from the chamber portion that is rearwardly of said flange to the chamber portion that is forwardly of said flange but preventing flow in the reverse direction; a reservoir of low pressure fluid overlying said chamber; a first compensating port communicating said reservoir with the area of said chamber rearwardly of the normal position of said flange and having a valve seat facing said chamber; a second compensating port communicating said reservoir to the forward end of said fluid pressure chamber and having a valve seat facing said fluid pressure chamber; first and second valve closure members for abutment with said valve seats of respective first and second compensating ports, each of said first and second valve closure members having a stem portion which projects through respective valve ports into said reservoir; a cross link in said reservoir connecting the tops of said stem portions; spring means biasing said valve closure members against said valve seats; and said first valve closure member having another projection which is abutted by said flange portion of said piston to open said compensating ports as said flange portion is retracted rearwardly into its normal position.

References Cited in the file of this patent
UNITED STATES PATENTS

| 2,203,082 | Dick | June 4, 1940 |

FOREIGN PATENTS

| 819,786 | Germany | Nov. 5, 1951 |
| 442,341 | Great Britain | Feb. 6, 1936 |